(12) United States Patent
Nakajima

(10) Patent No.: US 11,607,916 B2
(45) Date of Patent: Mar. 21, 2023

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 658 days.

(21) Appl. No.: 16/292,637

(22) Filed: Mar. 5, 2019

(65) Prior Publication Data
US 2019/0291516 A1 Sep. 26, 2019

(30) Foreign Application Priority Data
Mar. 26, 2018 (JP) .............................. JP2018-058489

(51) Int. Cl.
B60C 13/00 (2006.01)
B60C 13/02 (2006.01)

(52) U.S. Cl.
CPC ............ B60C 13/001 (2013.01); B60C 13/02 (2013.01)

(58) Field of Classification Search
CPC .............................. B60C 13/001; B60C 13/02
See application file for complete search history.

(56) References Cited

U.S. PATENT DOCUMENTS

| | | | | |
|---|---|---|---|---|
| 2003/0084979 A1* | 5/2003 | Matsumoto | ........... | B60C 13/001 152/523 |
| 2006/0032569 A1* | 2/2006 | Zimmer | ................. | G09F 7/165 152/524 |
| 2008/0283169 A1* | 11/2008 | Sato | ...................... | B60C 13/001 152/450 |
| 2010/0051159 A1* | 3/2010 | Fujioka | ................. | B60C 13/001 152/523 |
| 2010/0258231 A1* | 10/2010 | Nakamura | .............. | B60C 13/02 152/523 |
| 2012/0227879 A1* | 9/2012 | Muhlhoff | ............... | B23K 26/36 152/151 |

(Continued)

FOREIGN PATENT DOCUMENTS

DE 4111345 * 11/1991
EP 0490247 A1 6/1992
(Continued)

OTHER PUBLICATIONS

English machine translation of JP2007-083604. (Year: 2007).*
(Continued)

Primary Examiner — Robert C Dye
(74) Attorney, Agent, or Firm — Greenblum & Bernstein, P.L.C.

(57) ABSTRACT

A mark indicating portion arranged on a sidewall portion is provided with a reference surface provided on a surface of the sidewall portion and one or more marks formed on the reference surface. A surface of the or each mark is provided with a ridge line extending obliquely with respect to a tyre radial direction, a first surface portion positioned on an outer side in the tyre radial direction of the ridge line, and a second surface portion positioned on an inner side in the tyre radial direction of the ridge line. Each of the first surface portion and the second surface portion is inclined in a direction in which a height thereof from the reference surface is decreased as it goes away from the ridge line.

19 Claims, 6 Drawing Sheets

(56) References Cited

U.S. PATENT DOCUMENTS

2013/0263992 A1\* 10/2013 Matsumoto ........... B60C 13/001
                                                                               152/523
2020/0231011 A1\* 7/2020 Sekine ................... B60C 11/01

FOREIGN PATENT DOCUMENTS

| EP | 1625952 A1 | 2/2006 |
|----|------------|--------|
| JP | 9-86106 A | 3/1997 |
| JP | H09-226328 \* | 9/1997 |
| JP | H10-086615 \* | 4/1998 |
| JP | 2007-083604 \* | 4/2007 |
| JP | 2007083604 A | 4/2007 |
| JP | 2008273505 A | 11/2008 |
| JP | 2012116217 A | 6/2012 |
| JP | 2017065602 \* | 4/2017 |

OTHER PUBLICATIONS

English machine translation of JPH10-086615. (Year: 1998).\*
English machine translation of DE 4111345. (Year: 1991).\*
English machine translation of JP H09-226328. (Year: 1997).\*
European Search Report, European patent Office, Application No. 19160604.5, dated Aug. 14, 2019.

\* cited by examiner

TYRE

TECHNICAL FIELD

The present invention relates to a tyre having improved legibility of a mark provided on a sidewall portion.

BACKGROUND ART

Japanese Unexamined Patent Application Publication No. H9-86106 has disclosed a tyre having one or more marks, which are letters, symbols, and the like indicating the manufacturer name, brand name, size, and the like of the tyre, formed on a surface of at least one of the sidewall portions of the tyre. And in order to improve the legibility of the marks, the marks are formed to be one step higher than the surface of the sidewall portion, and ridges are provided on the surfaces of the marks, for example.

SUMMARY OF THE INVENTION

However, conventional marks have a constant height, therefore, even when a ridge is formed on the surface thereof, they have monotonous appearance and little change in contrast. Thereby, the legibility cannot be sufficiently improved.

Further, in a tyre meridian section, the surface of the sidewall portion is convexly curved. Thereby, depending on the placement position, the surfaces of the marks face downward or upward, therefore, the legibility may be deteriorated in some cases.

An object of the present invention is to provide a tyre capable of improving design property by providing a change in appearance of the marks and capable of improving the legibility of the marks.

In one aspect of the present invention, a tyre comprises a sidewall portion provided with a mark indicating portion having one or more marks, wherein the mark indicating portion comprises a reference surface provided on a surface of the sidewall portion and the one or more marks formed on the reference surface in a concave manner, a surface of the or each mark is provided with a ridge line extending obliquely with respect to a tyre radial direction, a first surface portion positioned on an outer side in the tyre radial direction of the ridge line, and a second surface portion positioned on an inner side in the tyre radial direction of the ridge line, and each of the first surface portion and the second surface portion is inclined in a direction in which a height thereof from the reference surface is decreased as it goes away from the ridge line.

In another aspect of the invention, it is preferred that a height of the ridge line from the reference surface is constant.

In another aspect of the invention, it is preferred that the ridge line extends diagonally on the surface of the or each mark.

In another aspect of the invention, it is preferred that the ridge line is a straight line or an arcuate curved line.

In another aspect of the invention, it is preferred that each of the first surface portion and the second surface portion is a flat surface or a concave or convex curved surface.

In another aspect of the invention, it is preferred that in the mark indicating portion, either the reference surface or the surface of the or each mark is provided with a plurality of small protruding portions.

In another aspect of the invention, it is preferred that each of the small protruding portions is a truncated conical protrusion having a smaller diameter on a side of an upper end thereof.

In another aspect of the invention, it is preferred that each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

In another aspect of the invention, it is preferred that each of the small protruding portions is a rib-shaped protrusion having a trapezoidal cross section with a thickness thereof decreasing toward an upper end thereof, and the rib-shaped protrusions are arranged parallel to each other or in a non-parallel manner.

In another aspect of the invention, it is preferred that each of the rib-shaped protrusions has a maximum thickness in a range of from 20 to 1000 micro meters and a protruding height in a range of from 200 to 500 micro meters, and a distance between the rib-shaped protrusions adjacent to each other is in a range of from 10 to 800 micro meters.

In another aspect of the invention, it is preferred that the mark indicating portion is provided with a base portion projecting from the surface of the sidewall portion at a constant height, and a surface of the base portion forms the reference surface.

DESCRIPTION OF THE PREFERRED EMBODIMENT

An embodiment of the present invention will now be described below in detail.

Figure 1:
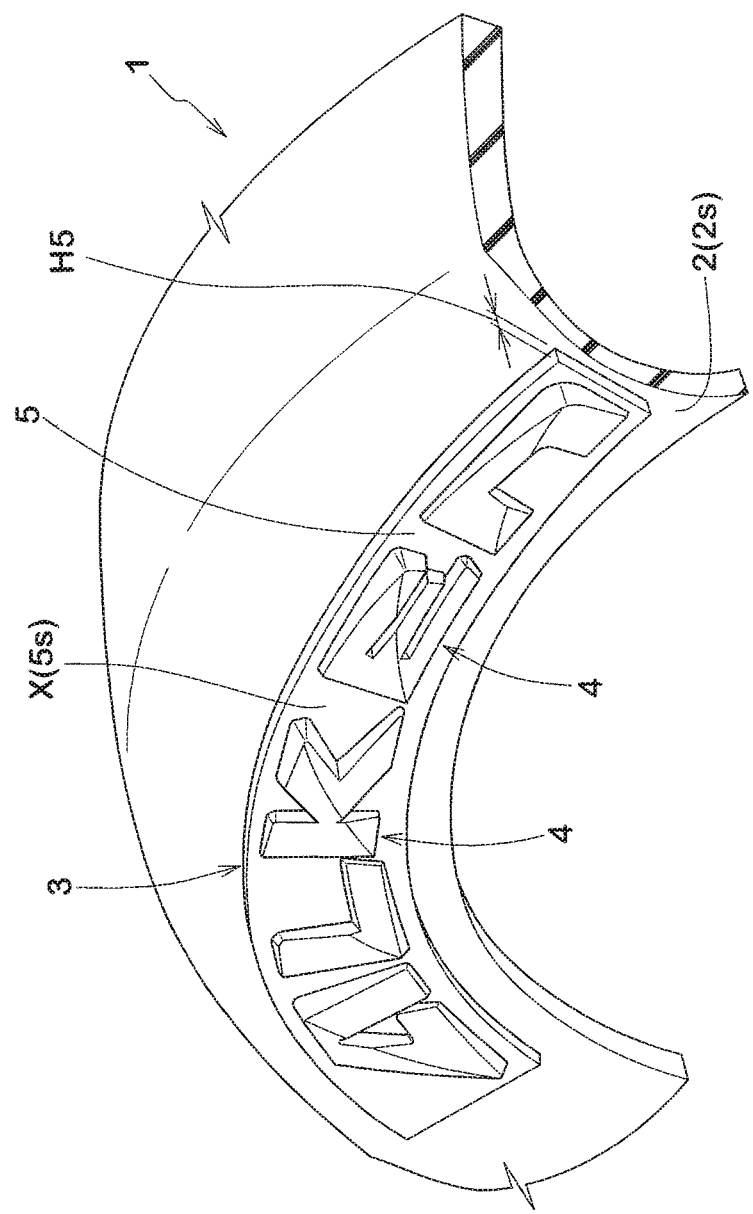
FIG. 1 is a partial perspective view of a tyre according to an embodiment of the present invention.

As shown in FIG. 1, a tyre 1 in this embodiment is provided with one or more mark indicating portions 3 in at least one of sidewall portions 2.

Each of the mark indicating portions 3 is provided with a reference surface (x) provided on a surface (2s) of a respective one of the sidewall portions 2 and one or more marks 4 formed on the reference surface (x). In this embodiment, each of the mark indicating portions 3 is provided with a base portion 5 which projects stepwise from the surface (2s) of a respective one of the sidewall portions 2 at a constant height (H5) (that is, a top surface of the base portion is not inclined with respect to the surface (2s)) and a surface (5s) of the base portion 5 forms the reference surface (x).

Each of the marks 4 is a letter, a symbol, a figure, and the like for representing the manufacturer name, brand name, size, and the like of the tyre, and in this embodiment, a case is shown in which a brand name consisting of a plurality of the marks 4 is formed on the reference surface (x).

Figure 2:
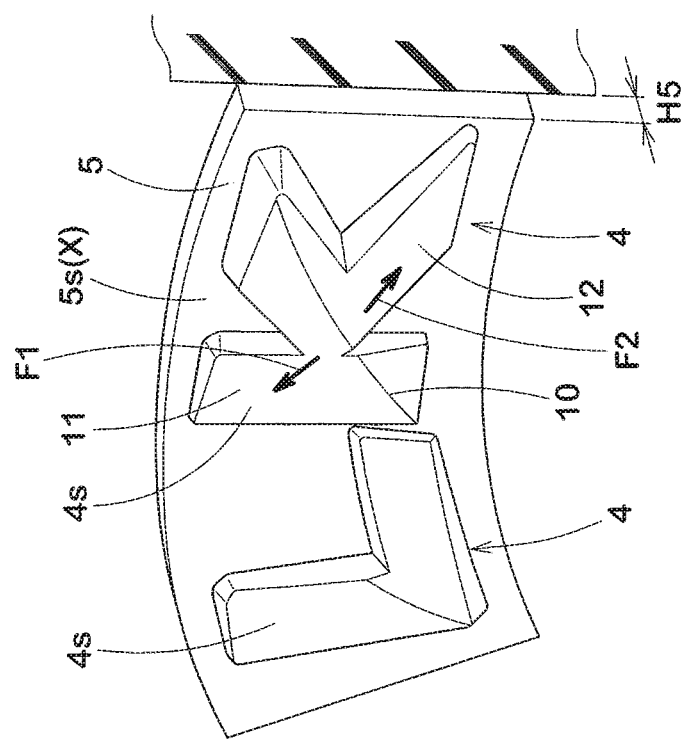
FIG. 2 is an enlarged partial perspective view of marks.
Figure 3A:
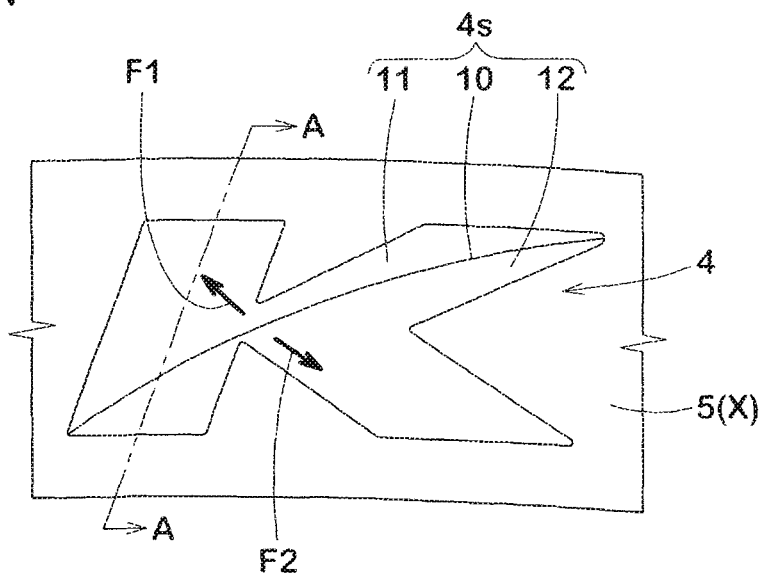
FIG. 3A is a front view of one of the marks.
Figure 3B:
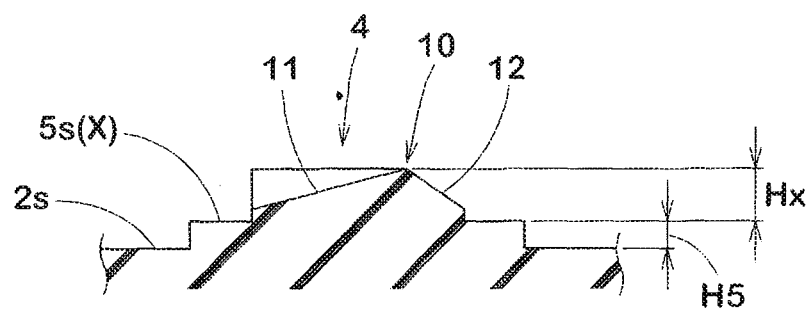
FIG. 3B is a cross-sectional view of the one of the marks taken along A-A line of FIG. 3A.

As shown in FIGS. 2, 3A, and 3B, a surface (4s) of each of the marks 4 is provided with a ridge line 10 extending obliquely with respect to a tyre radial direction, a first surface portion 11 positioned on an outer side in the tyre radial direction of the ridge line 10, and a second surface portion 12 positioned on an inner side in the tyre radial direction of the ridge line 10.

The ridge line 10 in this embodiment has a constant height (Hx) from the reference surface (x). It is preferred that the height (Hx) is larger than the height (H5) of the base portion 5 from the surface (2s) of a respective one of the sidewall portions 2 from the point of view of the legibility. The height (Hx) may vary in a length direction of the ridge line 10. In this case, it is preferred that the ridge line 10 is formed in an arcuate shape in which the height (Hx) is decreased gradually and smoothly from a center in the length direction toward both ends thereof.

Further, it is preferred that the ridge line 10 extends diagonally on the surface (4s) of each of the marks 4.

Figure 4A:
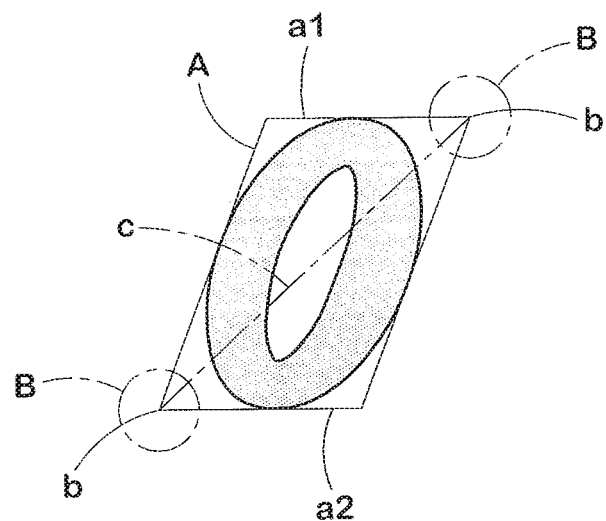
FIG. 4A is a diagram illustrating a diagonal line.
Figure 4B:
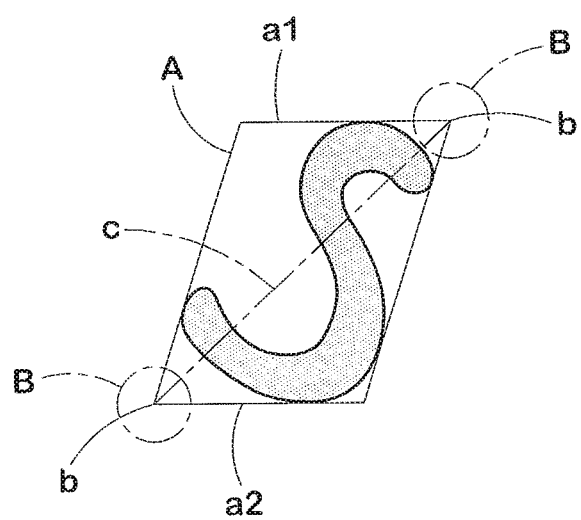
FIG. 4B is a diagram illustrating a diagonal line.

Here, "extending diagonally" is defined as follows. As shown in FIGS. 4A and 4B, when the smallest parallelogram among parallelograms (including the rectangles) surrounding one of the marks 4 is defined as a parallelogram (A), extending diagonally means extending in a direction so as to connect between diagonal neighborhoods (B) of the parallelogram (A). Here, the parallelogram (A) includes an upper side (a1) and a lower side (a2) extending in the tyre circumferential direction. Further, each of the diagonal neighborhoods (B) means a range in which a distance from a respective one of diagonals (b) of the parallelogram (A) is 10% or less of a length of a diagonal line (c). It is preferred that the ridge line 10 extends in a direction so as to connect between the diagonals (b).

As shown in FIG. 3A, the ridge line 10 in this embodiment is formed in an arcuate curved line in a front view of each of the marks 4. However, it can also be formed in a straight line.

Further, each of the first surface portion 11 and the second surface portion 12 is inclined in a direction in which a height thereof from the reference surface (x) is decreased as it goes away from the ridge line 10. In a case where the ridge line 10 is inclined toward upper right (FIG. 3A), for example, the first surface portion 11 is inclined toward an upper left direction F1 and the second surface portion 12 is inclined toward a lower right direction F2. In other words, the first surface portion 11 and the second surface portion 12 are inclined with respect to both the tyre circumferential direction and the tyre radial direction.

As just described above, the first surface portion 11 and the second surface portion 12 have components that are inclined in opposite directions (upward and downward) to each other with respect to the tyre radial direction, therefore, irrespective of the positions on the surfaces (2s) of the sidewall portions 2 at which the marks 4 are arranged, the surfaces (4s) of the marks 4 reflect light, thereby, it is possible that the legibility is increased. Further, the first surface portion 11 and the second surface portion 12 have components that are inclined in opposite directions to each other with respect to the tyre circumferential direction as well, therefore, the reflecting surfaces appear changing and sparkling when the tyre rotates, thereby, it is possible that quality of products appearance is improved. Moreover, each of the surfaces (4s) is inclined in a mountain shape, therefore, a change is given to the appearance of the marks 4, thereby, the stereoscopic effect is increased. Therefore, it is possible that the design property and the legibility are improved.

Each of the first surface portion 11 and the second surface portion 12 can be formed as a flat surface. However, it can also be formed as a curved surface curved in a concave manner or a convex manner, for example. Note that although not shown, in a cross section taken orthogonal to the ridge line 10, it is preferred that an inclination angle of the first surface portion 11 with respect to the reference surface (x) is the same as an inclination angle of the second surface portion 12 with respect to the reference surface (x) from a point of view of the design property. Further, from the point of view of the design property, it is preferred that a ratio (J1/J2) between an area (J1) of the first surface portion 11 and an area (J2) of the second surface portion 12 is in a range of from 0.7 to 1.3 when the surface (4s) is viewed from the front.

Figure 5A:
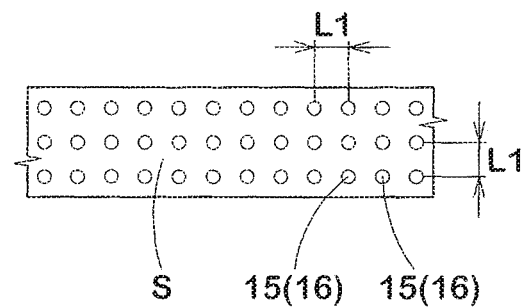
FIG. 5A is a partial plan view showing an arrangement of small protruding portions formed as truncated conical protrusions.
Figure 5B:
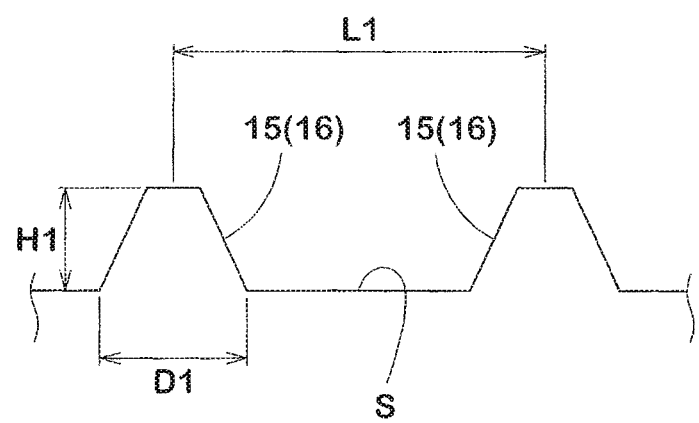
FIG. 5B is a cross-sectional view of the truncated conical protrusions.

Further, in each of the mark indicating portions 3, as shown in FIGS. 5A and 5B, it is preferred that a surface (s) which is either the reference surface (x) or the surface (4s) of each of the marks 4 is provided with a plurality of small protruding portions 15 each protruding from the surface (s). In this embodiment, a case where each of the small protruding portions 15 is a truncated conical protrusion 16 having a smaller diameter on a side of an upper end thereof is shown. It is preferred that each of the truncated conical protrusions 16 has a maximum diameter (D1) in the range of from 50 to 1000 micro meters and a protruding height (H1) from the surface (s) in the range of from 50 to 1000 micro meters, and that a distance (L1) between centers of the small protruding portions 15 adjacent to each other is in the range of from 200 to 1000 micro meters.

It is possible that the truncated conical protrusions 16 configured as such irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved.

As a result of research by the present inventor, when the maximum diameter (D1) and the protruding height (H1) of each of the truncated conical protrusions 16, and the distance (L1) of the truncated conical protrusions 16 are outside the above ranges, the surface (s) looks whitish due to the reflection of light, therefore, the contrast difference between the marks 4 and the reference surface (x) tends to be decreased. Note that by configuring each of the small protruding portions 15 to have a truncated cone shape, it is possible that the reflection of light is further suppressed while the strength is increased as compared with a cylindrical shape.

In this embodiment, a case is shown in which the truncated conical protrusions 16 are arranged in a grid pattern, but they may be arranged in a staggered pattern, or may be randomly arranged as long as the distance (L1) satisfies the above range.

Figure 6A:
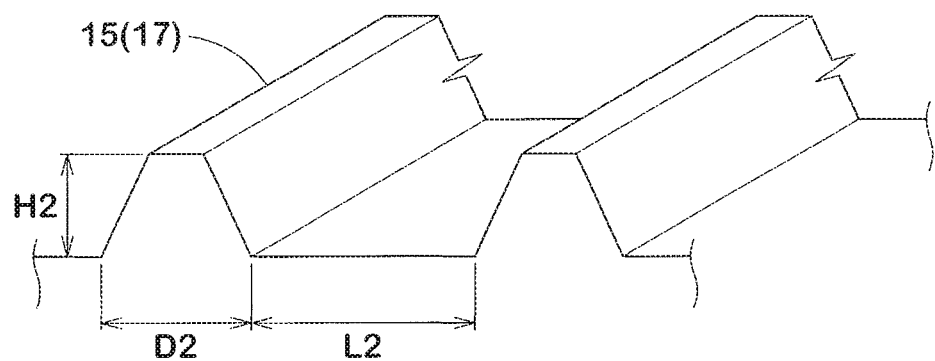
FIG. 6A is a partial perspective view showing an arrangement and cross sections of the small protruding portions formed as rib-shaped protrusions.
Figure 6B:
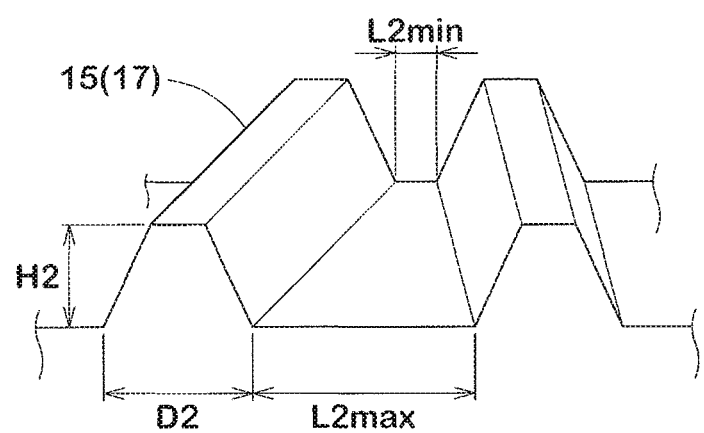
FIG. 6B is a partial perspective view showing another arrangement and the cross sections of the small protruding portions formed as the rib-shaped protrusions.

FIGS. 6A and 6B show another embodiment of the small protruding portions 15. In this embodiment, a case is shown where each of the small protruding portions 15 is a rib-shaped protrusion 17 having a trapezoidal cross section with a thickness thereof decreasing toward an upper end thereof. The rib-shaped protrusions 17 can be arranged parallel to each other as shown in FIG. 6A, or they can be arranged so as not to be parallel to each other (non-parallel) as shown in FIG. 6B. It is preferred that each of the rib-shaped protrusions 17 has a maximum thickness (D2) in a range of from 20 to 1000 micro meters and a protruding height (H2) in a range of from 200 to 500 micro meters, and that a distance (L2) between the rib-shaped protrusions 17 adjacent to each other is in a range of from 10 to 800 micro meters. Note that in a case where the rib-shaped protrusions 17 are arranged in the non-parallel manner, it is preferred that an average value of a maximum value (L2max) and a minimum value (L2 min) of the distance (L2) is in a range of from 10 to 800 micro meters.

As is the case with the truncated conical protrusions 16, it is possible that the rib-shaped protrusion 17 irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved. As a result of research by the present inventor, when the maximum thickness (D2) and the protruding height (H2) of each of the rib-shaped protrusions 17, and the distance (L2) of the rib-shaped protrusions 17 are outside the above ranges, the surface (s) looks whitish due to the reflection of light, therefore, the contrast difference between the marks 4 and the reference surface (x) tends to be decreased. Note that, from a point of view of the contrast, it is more preferred that the rib-shaped protrusions 17 are arranged in the non-parallel manner.

In each of the mark indicating portions 3, it is possible that the marks 4 are formed directly on the surface (2s) of a respective one of the sidewall portions 2 without having the base portion 5 formed thereon. In this case, the surface (2s) of the sidewall portion 2 forms the reference surface (x). In this case, in order to distinguish the mark indicating portions 3 from other portions, it is preferred that the surface (2s) of each of the sidewall portions 2 is provided with a rib and the like having a small height and surrounding a respective one of the mark indicating portions 3.

While detailed description has been made of the tyre as especially preferred embodiments of the present invention, the present invention can be embodied in various forms without being limited to the illustrated embodiments.

WORKING EXAMPLES (EXAMPLES)

Tyres provided with the mark indicating portions on the surface of the sidewall portions were made by way of test according to the specifications listed in Table 1, and then the legibility of the marks was compared.

In Examples 1 to 5, the ridge line extended diagonally in each of the marks. In the Examples 1 to 5, the height (Hx) of each of the ridge lines was constant, and in a plan view, each of the ridge lines was formed in an arcuate curved line. Further, in each of the marks, the first surface portion and the second surface portion which were divided by the ridge line were each formed as a flat surface. In Reference 1, no ridge line was provided and the surface of each of the marks was formed as a flat surface.

In the Examples 2 to 5, the small protruding portions were formed on the surfaces of the marks. In the Examples 2 and 3, the small protruding portions were the truncated conical protrusions each having the maximum diameter (D1) of 320 micro meters and the protruding height (H1) of 500 micro meters, and the distance (L1) was 400 micro meters. In the Examples 4 and 5, the small protruding portions were the rib-shaped protrusions each having the maximum thickness (D2) of 160 micro meters and the protruding height (H2) of 200 micro meters, and the distance (L2) was 200 micro meters.

The legibility was evaluated by a visual observation and the evaluation is indicated by an index based on the Reference 1 being 100, wherein a larger numerical value is better.

TABLE 1

| <Mark indicating portion> | Ref. 1 | Ex. 1 | Ex. 2 | Ex. 3 | Ex. 4 | Ex. 5 |
|---|---|---|---|---|---|---|
| Base portion | | Present | Absent | | Present | |
| Mark | | | Present (convex) | | | |
| Presence or Absence of Ridge line | Absence | | Presence | | | |
| Direction of Ridge line | — | | Diagonal | | | |
| Inclination of Surface | Not inclined | | Inclined (mountain shape) | | | |
| Small protruding portion | Absent | Absent | Truncated conical protrusion | Truncated conical protrusion | Rib-shaped protrusion (parallel) | Rib-shaped protrusion (non-parallel) |
| Legibility | 100 | 110 | 115 | 108 | 130 | 135 |

As shown in Table 1, it was confirmed that the tyres as the Examples showed excellent legibility of the marks.

The invention claimed is:

1. A tyre comprising a sidewall portion provided with a mark indicating portion having one or more marks, wherein
the mark indicating portion comprises a reference surface provided on a surface of the sidewall portion and the one or more marks formed on the reference surface in a convex manner,
a surface of the or each mark is provided with a ridge line extending obliquely with respect to a tyre radial direction, a first surface portion positioned on an outer side in the tyre radial direction of the ridge line, and a second surface portion positioned on an inner side in the tyre radial direction of the ridge line,
each of the first surface portion and the second surface portion is inclined so that a height thereof from the reference surface is decreased as it goes away from the ridge line,
the surface of the or each mark consists of a side surface portion extending outward in a tire axial direction from the reference surface so as to surround the or each mark entirely, the first surface portion, and the second surface portion,
the entire first surface portion is inclined in one direction with respect to the tire axial direction,
the entire second surface portion is inclined in another direction with respect to the tire axial direction,
the ridge line is an arcuate curved line as a whole in a front view of the or each mark, and the ridge line extends diagonally on the surface of the or each mark.

2. The tyre according to claim 1, wherein
a height of the ridge line from the reference surface is constant.

3. The tyre according to claim 1, wherein
each of the first surface portion and the second surface portion is a flat surface or a concave or convex curved surface.

4. The tyre according to claim 1, wherein
in the mark indicating portion, either the reference surface or the surface of the or each mark is provided with a plurality of small protruding portions.

5. The tyre according to claim 4, wherein
each of the small protruding portions is a truncated conical protrusion having a smaller diameter on a side of an upper end thereof.

6. The tyre according to claim 5, wherein
each of the truncated conical protrusions has a maximum diameter in a range of from 50 to 1000 micro meters and a protruding height in a range of from 50 to 1000 micro meters, and
a distance between centers of the truncated conical protrusions adjacent to each other is in a range of from 200 to 1000 micro meters.

7. The tyre according to claim 1, wherein
the mark indicating portion is provided with a base portion projecting from the surface of the sidewall portion at a constant height, and
a surface of the base portion forms the reference surface.

8. The tyre according to claim 7, wherein
a height of the ridge line from the reference surface is larger than the height of the base portion from the surface of the sidewall portion.

9. The tyre according to claim 1, wherein
a height of the ridge line from the reference surface varies in a length direction of the ridge line.

10. The tyre according to claim 9, wherein
the height of the ridge line is decreased gradually and smoothly from a center in the length direction toward both ends of the ridge line.

11. The tyre according to claim 1, wherein
the surface of the sidewall portion forms the reference surface and is provided with a rib surrounding the mark indicating portion.

12. The tyre according to claim 1, wherein
in at least one of the one or more marks, the entire ridge line is arranged on a single arcuate curved line without an inflection point over an entire length thereof in a front view of the at least one of the one or more marks, and
the single arcuate curved line extends to connect diagonal neighborhoods of a smallest parallelogram among parallelograms surrounding the at least one of the one or more marks.

13. The tyre according to claim 12, wherein
a height of the ridge line from the reference surface varies in a length direction of the ridge line, and
the height of the ridge line is decreased gradually and smoothly from a center in the length direction toward both ends of the ridge line.

14. The tyre according to claim 12, wherein
the mark indicating portion has a plurality of the marks, and
the ridge lines of the marks are inclined to a same side with respect to the tyre radial direction.

15. The tyre according to claim 12, wherein the ridge line is formed in an arcuate shape so that the height thereof is decreased gradually and smoothly from a center in a length direction thereof toward both ends thereof.

16. The tyre according to claim 12, wherein
the mark indicating portion has a plurality of the marks,
the ridge lines of the marks are inclined to a same side with respect to the tyre radial direction, and
the ridge line of each mark is formed in an arcuate shape so that the height thereof is decreased gradually and smoothly from a center in a length direction thereof toward both ends thereof.

17. The tyre according to claim 1, wherein the ridge line is formed in an arcuate shape so that the height thereof is decreased gradually and smoothly from a center in a length direction thereof toward both ends thereof.

18. The tyre according to claim 1, wherein
the mark indicating portion has a plurality of the marks, and
the ridge lines of the marks are inclined to a same side with respect to the tyre radial direction, and
the ridge line of each mark is formed in an arcuate shape so that the height thereof is decreased gradually and smoothly from a center in a length direction thereof toward both ends thereof.

19. The tyre according to claim 1, wherein
the mark indicating portion has a plurality of the marks formed on the reference surface in a convex manner, and
the ridge lines of the marks are inclined to a same side with respect to the tyre radial direction.

* * * * *